United States Patent Office 3,035,049
Patented May 15, 1962

3,035,049
18-OXYGENATED PREGNANE COMPOUNDS
Tadeus Reichstein, Albert Wettstein, Georg Anner, Jean-Rene Billeter, and Karl Heusler, Basel, Robert Neher, Binningen, Julius Schmidlin, Basel, Hellmut Ueberwasser, Riehen, and Peter Wieland, Basel, Switzerland; said Wettstein, Anner, Billeter, Heusler, Neher, Schmidlin, Ueberwasser, and Wieland assignors to said Reichstein
No Drawing. Filed Oct. 28, 1958, Ser. No. 770,015
Claims priority, application Switzerland Jan. 15, 1954
20 Claims. (Cl. 260—239.55)

This is a continuation in part of application Serial No. 585,142 filed May 16, 1956, now abandoned, which is in turn a continuaton in part of application Serial No. 480,061 filed January 5, 1955, now U.S. Patent No. 2,904,545.

The highly active hormone of the suprarenal glands which is responsible for the regulation of the mineral metabolism in the human body is known to be a pregnene compound of the following formulae which obviously represent an equilibrium

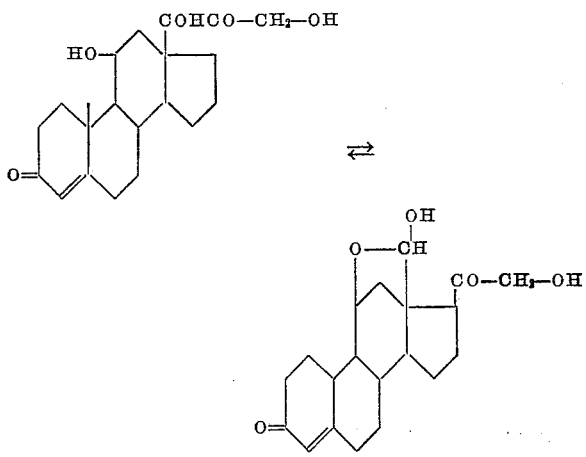

Since this important hormone has so far been available only by a tedious extraction procedure from suprarenal glands of animals and could only be obtained in very low yield (40 to 95 mg. from 1000 kilos of fresh beef adrenals), a synthesis of this hormone and closely related 18-oxygenated hormones (e.g. the 18-hydroxy compound corresponding to aldosterone, viz. $\Delta^4$-3:20-dioxo-11$\beta$:18:21-trihydroxy pregnene, i.e. 18-hydroxy-corticosterone, which shows a similar high physiological activity) from readily available compounds either from other naturally occurring steroids or a total synthesis is of extraordinary technical importance.

The present invention provides a series of intermediates which can readily be converted into aldosterone or into 18-hydroxy-corticosterone, thus making these hormones available in sufficient quantity.

The invention more specifically relates to compounds of the formulae (A)

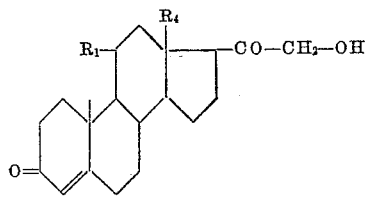

and (B)

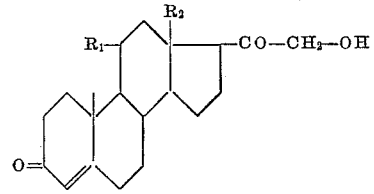

and derivatives thereof, such as ketals, esters and ethers, in which formula $R_1$ represents a hydroxy or oxo group, $R_2$ a hydroxymethyl, an aldehyde- or carboxyl-group and $R_3$ a pyruvic acid or $\beta$-halogen pyruvic acid radical and $R_4$ a hydroxymethyl or carboxyl group.

All the above mentioned compounds are convertible by the methods indicated below and more specifically described in the examples into $\Delta^4$-3,20-dioxo-21-hydroxy-pregnenes of the formula (C)

or derivatives thereof, such as ketals, esters and ethers, in which formulae $R_1$ and $R_2$ have the same meaning as in the above formulae A and B.

If $R_1$ represents a hydroxy group and $R_2$ an aldehyde group or a hydroxymethyl group the above formulae is identical with that of aldosterone or 18-hydroxy-corticosterone. If however $R_1$ and $R_2$ are different they are converted into a hydroxy- and an aldehyde-group or hydroxymethyl group, respectively, as follows:

If $R_1$ is an oxo group, the compound of the above Formulae C is treated in an inert solvent, such as benzene or a halogenated hydrocarbon such as dichloroethylene, with a ketalizing agent such as ethyleneglycol, trimethylene glycol, mercaptoethanol, or dithioglycol in the presence of an acidic catalyst, whereby all the oxo groups present in the molecule are converted into ketal groups except for the 11-oxo-group, which then can be reduced by treatment with a complex metal hydride such as sodium- or lithium- borohydride or lithium aluminium hydride in the conventional manner.

The conversion of $R_2$ into an aldehyde- or hydroxymethyl group in compounds of the above Formulae C wherein $R_1$ represents an oxy group is performed in the following way:

The conversion of an (18→11)-lactone of an 11$\beta$-hydroxy-18-acid into the hydroxy aldehyde or the hydroxy-hydroxymethyl compound is described in detail in our copending application Serial No. 770,006 filed October 28, 1958 and is effected by reduction with a limited amount of a complex metal hydride, such as lithium aluminium hydride, after protection of the free oxo groups in the 3- and 20-positions by ketalization as described above.

The derivatives of the compounds of the Formulae A and B may be esters, thioesters, enolesters, ethers, enolethers, thioethers, acetals, ketals, mercaptals, lactones, cyclosemiacetals, thiol- and thionesters, enamines, hydrazones, semicarbazones and the like. In the starting materials as well as in the final products an aldehyde- or carboxyl-group in 13-position can be acetalized or lactonized with a hydroxyl group in 11-position. The hydroxyl group of 18:11-cyclosemiacetals can also be functionally converted, for instance esterified with organic acids, such as acetic and benzoic acid or etherified, for instance with benzyl alcohol. The compounds can be racemic or optically active.

The process for the preparation of the compounds of the Formulae A and B or their derivatives consists in reacting a compound of the formula

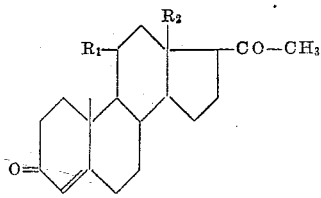

or the corresponding 3-ketal, wherein $R_1$ and $R_2$ have the meaning given for the Formula A, with an oxalic acid ester, treating the resulting 21-oxalo acid esters in the form of their enol salts with a halogen, subjecting to acid cleavage the 21-halogen-21-oxalo acid esters formed, converting the 21-halides obtained into the 21-esters or 21-hydroxy compounds and, if desired, liberating functionally converted hydroxyl-, oxo- or carboxyl-groups.

The reaction with oxalic acid esters, for example an oxalic acid alkyl ester, such as methyl-, ethyl-, propyl- or benzyl-ester, is carried out in the presence of a basic condensing agent. As condensing agents there are suitable more especially alcoholates, for example sodium methylate, sodium ethylate or potassium tertiary butylate.

Resulting racemic 21-oxalo acid esters can be cleaved into their antipodes by methods per se. For example, they can be converted by gentle alkaline hydrolysis into the free 21-oxalo acids, the latter reacted with optically active bases, such as strychnine or brucine to form the corresponding salts, the diastereomeric components separated by fractional crystallization, the antipode of the 21-oxalo acids liberated from the salts and the former, if desired, converted into their esters.

The enol salts of the 21-oxalo acid esters formed are treated with chlorine, bromine or iodine or agents yielding these halogens, for example N-halogen amides or imides. Iodine is particularly suitable for this reaction. It is of advantage to carry out this operation in the presence of lower aliphatic alcohols, such as methanol or ethanol.

For the purpose of acid cleavage the 21-halogen-21-oxalo acid esters are subjected to the action of an alkaline agent, for example an alkali metal hydroxide or alcoholate. When other alkali sensitive groups are present in the molecule, for example an (18→11)-lactone or 18:11-cyclosemiacetal, the cleavage is carried out with advantage in an anhydrous medium with approximately equimolecular quantities of an alkali metal alcoholate, for example sodium methylate or ethylate. An advantageous method of working in this step of the process consists in pouring the reaction mixture into an aqueous buffer solution, for example into an aqueous solution containing a molecular equivalent of monosodium phosphate.

The 21-halides can be transformed by reaction with salts of organic or inorganic acids, for example acetic acid, propionic acid, butyric acid, trimethylacetic acid, crotonic acid, oenanthic acid, palmitic acid, benzoic acid, phenylacetic acid, β-cyclopentyl-propionic acid or phosphoric acid into the corresponding 21-esters. The 21-esters so obtained as well as the 21-halides can be converted by hydrolysis, for example with alkaline agents, for example with bicarbonates, into the 21-hydroxy compounds.

According to this process, the conversion of functionally converted hydroxyl and oxo groups into free groups can be carried out by methods in themselves known. For example, ketals and acetals, open chain as well as cyclic ones, e.g. ethylene ketals, can be split by treatment with mineral acids or sulfonic acids at room temperature, advantageously in the presence of a ketone, such as acetone or pyruvic acid, or by heating gently with dilute acetic acid. Under the same acid conditions, enol ethers or tetrahydropyranyl ethers are also split. Benzyl ethers can moreover be split easily with hydrogen in the presence of a catalyst, for example palladium on carrier substances, such as animal carbon or alkaline earth carbonates.

Racemates obtained can be split into their antipodes by known methods at any stage of the process.

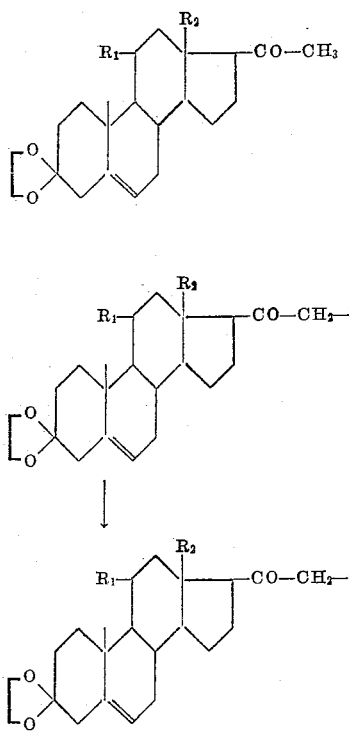

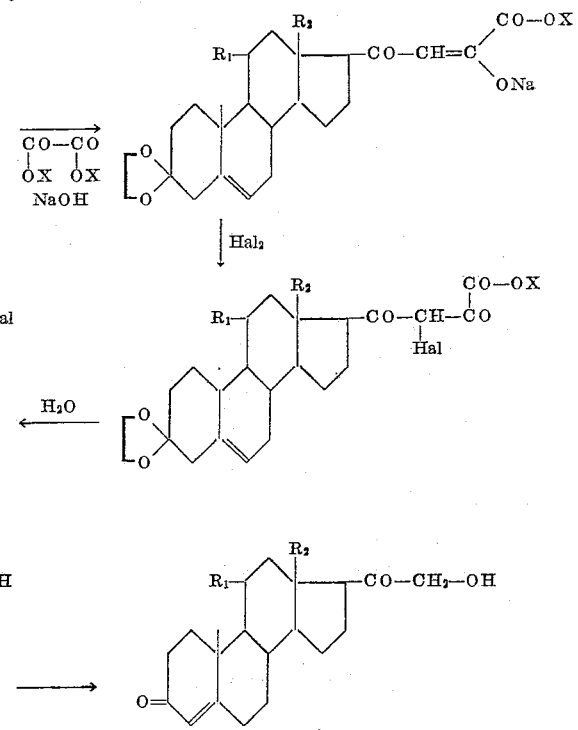

The starting materials are new. They can be made by the process of our copending applications Serial No. 769,996 filed October 28, 1958, Serial Nos. 585,143 filed May 16, 1956, now U.S. Patent No. 2,986,567 and 585,167 filed May 16, 1956, now U.S. Patent No. 2,934,543 and as indicated in the examples.

The reactions described in these applications are illustrated for the preparation of the (11β→18)-lactone by the following reaction scheme:

tion to natural aldosterone, in which the side chain has the β-orientation.

The present invention, thus, additionally provides a process which enables these hitherto unusable by-products to be converted into products suitable for the synthesis of aldosterone, or, if desired, into aldosterone itself. In

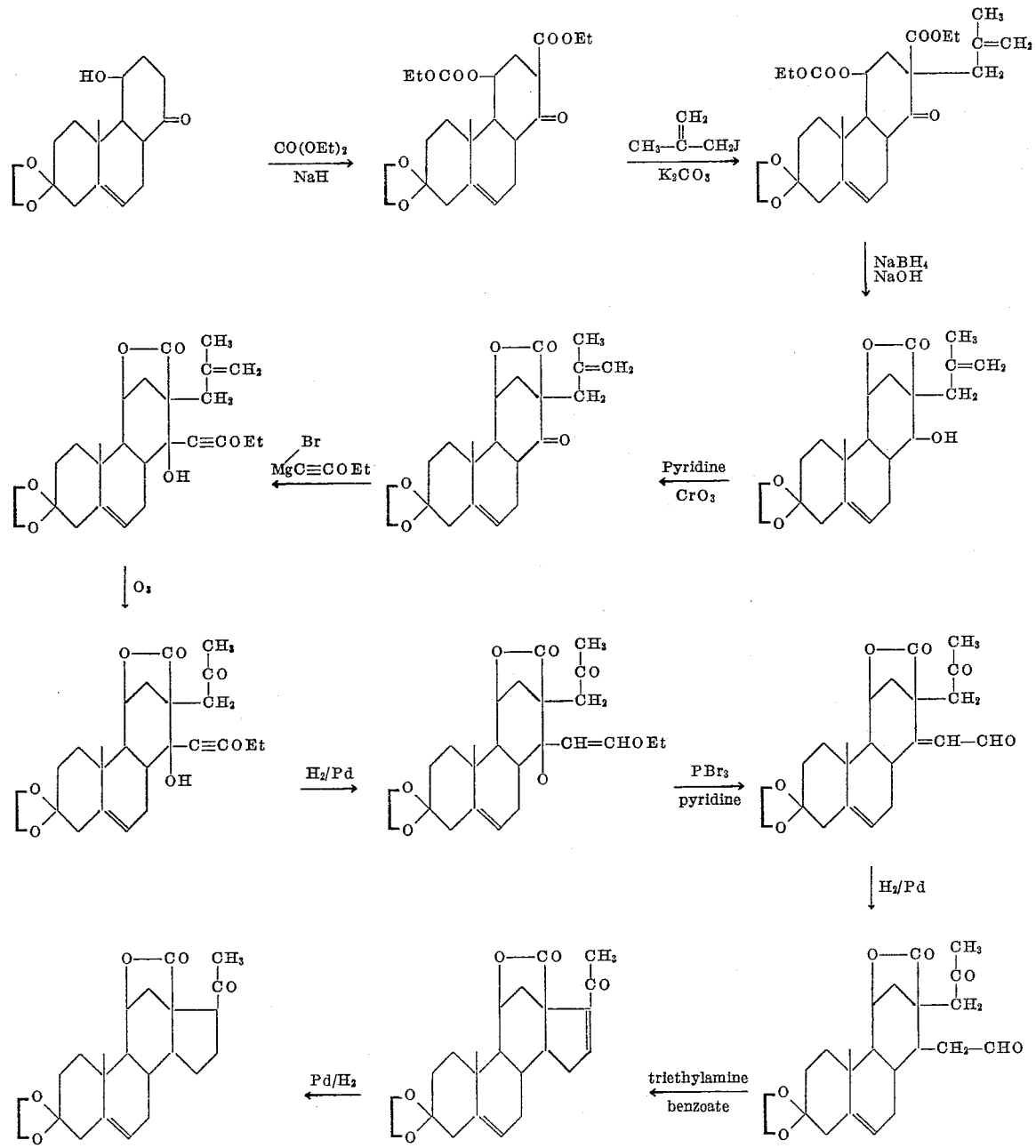

It has also been found that in the course of the total synthesis of steroids which are oxygenated in the 18- and 21-positions, the action of alkalies at those stages in the process in which an oxo group is present at the 20-carbon atom leads to larger or smaller quantities of by-products which upon carrying out the remaining steps of the synthesis lead to a compound isomeric with aldosterone. It has been found that these by-products are 17-iso-compounds, that is to say, substances in which the side chain at the 17-carbon atom is in α-orientation, in contradistincthe process of this invention a 17-iso-compound of the formula

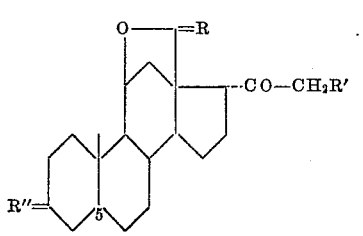

in which R represents an oxo group or a hydrogen atom and a free, esterified or etherified hydroxyl group, R' represents a free or esterified hydroxyl group, and R" represents a free or ketalised oxo group, and which may also contain a double bond starting from the 5-carbon atom is treated with an alkaline agent and the resulting compound having a 17β-side chain separated.

Various basic agents are suitable for the isomerisation, for example, alkali metal bicarbonates, carbonates or hydroxides, or alkali metal alcoholates, for example, sodium methylate or ethylate, potassium tertiary butylate or amylate, aluminum oxide and also strong organic bases such as pyrrolidine, piperidine, trimethyl-benzyl ammonium hydroxide or alkoxides. With the use of strong bases such as alkali metal hydroxides or alcoholates the isomerization takes place even at temperatures up to 20° C., while in the case of weaker bases, for example organic bases or alkali metal bicarbonates, a higher temperature is necessary to produce a more rapid reaction. The process may be carried out in an aqueous medium or, especially in the case of organic bases, in an anhydrous medium, for example, in a lower alcohol, such as methanol, ethanol or the like, or in dioxane or tetrahydrofurane or mixtures thereof. When organic bases are used hydrocarbons are also suitable such as benzene, toluene or xylene. The reaction leads to an equilibrium mixture of the two isomers, from which the desired 17β-compound can be obtained in the usual manner, for example, by chromatography on suitable adsorbents, for example, silica gel, or by distribution on paper or cellulose. The rearrangement of this invention can be carried out in an especially simple manner and in a high yield by separating the 17β-compound from the starting material due to its lower solubility or higher speed of crystallisation by inoculation direct from the equilibrium mixture.

By the alkaline treatment, especially in an aqueous medium, any ester groups present in the 18- and/or 21-positions can be hydrolysed simultaneously with the isomerization.

The invention also includes the 18,21-oxygenated 17-iso-compounds used as starting materials in the aforesaid process, and especially the (18→11)-lactone of $\Delta^4$-3:20-dioxo-11β-21-dihydroxy-17-iso-pregnene-18 acid and its 21-acylates, and also the 3-ketals derived from these compounds, and its 18:21-diacylates of 18:21-aldosterone and its 18:21-diacylates and 17-iso-monoacylates. The aforesaid acylates are obtained from the corresponding free 21-hydroxy-17-iso-pregnene-compounds, for example, by the action of reactive derivatives of saturated or unsaturated aliphatic or cycloaliphatic carboxylic acids or aromatic, araliphatic or heterocyclic carboxylic acids. There are suitable, for example, reactive derivatives of formic acid, acetic acid, trifluoracetic acid, propionic acid, butyric acids, valeric acids, such as n-valeric acid, or trimethylacetic acid, caproic acids, such as β-trimethyl propionic acid, oenanthic acid, caprylic acid, pelargonic acid, capric acid, undecylic acids, for example, undecylenic acid, lauric acid, myristic acid, palmitic acid or stearic acid, for example, oleic acid or cyclopentyl-, cyclohexyl- or phenyl-acetic or -propionic acids, benzoic acid, hexahydrobenzoic acid, furane-2-carboxylic acid, nicotinic acids, and also dicarboxylic acids such as oxalic acid, succinic acid or glutaric acid, or substituted carboxylic acids such as β-keto-carboxylic acids, for example, acetoacetic acid, propionyl acetic acid, butyrylacetic acid or caprinoylacetic acid or amino acids.

The 17α-materials may be obtained, if desired, by the alkaline treatment of the corresponding 17β-compounds, which latter may be obtained as shown above. They are racemates or the corresponding enantiomeric forms.

The following examples illustrate the invention, the relation between part by weight and part by volume being the same as that between the gram and the cubic centimeter.

*Example 1*

To a mixture of 8.25 g. of the d:l-Δ⁵-3-ethylene-dioxy-11β:18-dihydroxy-20-oxo-pregnene described in Example 6 hereafter, 4.7 g. of freshly prepared dry sodium methylate and 9.4 g. of oxalic acid dimethyl ester are added 65 cc. of dry benzene. The whole is then stirred for 24 hours in a current of nitrogen at room temperature. After adding ice and cautiously acidifying, the mixture is immediately extracted by agitation with ether. The ethereal solution is extracted with 173 cc. of a 1 N-solution of caustic potash, and the aqueous alkaline solution is allowed to stand at room temperature for 1 hour. It is then cautiously acidified while cooling with ice and again immediately extracted by agitation with ether. From the residue obtained by drying and evaporating in vacuo the ethereal solution there is obtained by crystallisation d:l-Δ⁵-3-ethylenedioxy-11β:18-dihydroxy-aetienoyl-pyruvic acid in the form of colorless crystals.

2.31 g. of the acid so obtained are mixed with 600 cc. of water which contains 25 g. of disodium hydrogen phosphate, and then a suspension of 1.27 g. of iodine in 120 cc. of ether is slowly added while stirring. When the color of the iodine has disappeared, a solution of 1.2 g. of potassium hydroxide in 36 cc. of water is added, and the whole is stirred in the dark for 24 hours in an atmosphere of nitrogen. To the residue obtained by separating, drying and evaporating in vacuo the ethereal solution are added 8 g. of dry potassium acetate and 100 cc. of acetone. After boiling the mixture for one hour under reflux, the acetone is evaporated in vacuo and the residue is extracted several times with ether. From the ethereal solutions there is obtained by washing with water, drying and evaporating those solutions, crude d:l-Δ⁵-3-ethylene-dioxy-11β:18-dihydroxy-20-oxo-21-acetoxy-pregnene, which is obtained in a pure form by chromatography over aluminum oxide.

0.25 g. of the ketal is stirred overnight with a solution of 0.05 g. of para-toluene sulfonic acid in 20 cc. of acetone. After dilution with a saturated solution of sodium chloride and extraction by agitation with chloroform, there is obtained from the washed, dried and evaporated chloroform solutions d:l-18-hydroxy-corticosterone acetate.

Hydrolysis of the resulting acetate is carried out as follows:

A solution of 0.3 g. of potassium bicarbonate in 10 cc. of water is added to 0.25 g. of d:l-18-hydroxy-corticosterone acetate and 40 parts by volume of methanol in a current of nitrogen, while stirring. After allowing the whole to stand for 48 hours at 20° C. in an evacuated vessel, the mixture is evaporated in vacuo to one fifth of its original volume and extracted by agitation with a mixture of chloroform and ether (1:3). The residue obtained by washing with water, drying and evaporating in vacuo the organic solution is chromatographed over 10 parts of aluminum oxide (activity II, neutral), whereby d:l-18-hydroxy-corticosterone is obtained.

*Example 2*

A mixture of 1.932 parts by weight of the (18→11β)-lactone of d:l-Δ⁵-3:3-ethylenedioxy-11β-hydroxy-20-keto-pregnene-18-acid in 90 parts by volume of benzene and 40 parts by volume of a freshly prepared benzene solution which is 0.2 N with respect to sodium methylate and 0.5-molar with respect to oxalic acid dimethyl ester, is stirred for 16 hours with exclusion of moisture at room temperature. It is then poured into 80 parts by volume of 1-molar sodium dihydrogen phosphate solution and the whole extracted by shaking with chloroform-benzene mixture (1:1). The extract washed with water and dried with sodium sulfate is evaporated under reduced pressure and the completely crystalline residue freed from oxalic acid dimethyl ester under high vacuum at 40° C. By recrystallization of the crude product from anhydrous ether using methylene chloride as solution promoter, the (18→11β)-lactone of d,l-Δ⁵-3:3-ethylenedioxy-11β-hydroxy-20-oxo-pregnene-18-acid-21-oxalo-acid methyl ester is obtained in small needles of M.P. 199–202° C. (with decomposition).

To a suspension, cooled to 0° C., of 0.945 part by weight of the (18→11β)-lactone of d,l-Δ⁵3:3-ethylenedioxy-11β-hydroxy-20-oxo-pregnene-18-acid-21-oxalo-acid methyl ester in 24.0 parts by volume of methanol there are added with exclusion of moisture and with stirring, 4.00 parts by volume of a 0.5 N-methanolic sodium methylate solution and after a clear solution has been produced the whole is treated within one minute first with 13.5 parts by volume of a methanolic 0.15-molar iodine solution and after stirring for 15 minutes with a second portion of 4.00 parts by volume of 0.5 N-methanolic sodium methylate solution. The mixture is then stirred for a further 3½ hours at 0° C. and then the separation of the iodo ketone completed by addition of 5.0 parts by volume of 0.5-molar sodium dihydrogen phosphate solution and 40 parts by volume of 50% aqueous methanol. The fine crystalline colorless substance, filtered with suction from the mother liquor constitutes the (18→11β)-lactone of d,l-Δ⁵-3:3-ethylene-dioxy-11β-hydroxy-20-oxo-21-iodo-pregnene-18-acid; this is advantageously without further purification subjected to the following reaction with potassium acetate.

The resulting crystalline (18→11β)-lactone of d,l-Δ⁵-3:3 - ethylenedioxy - 11β-hydroxy - 20 - oxo - 21 - iodo-pregnene-18-acid, after rinsing with 60 parts by volume of acetone, is added to potassium acetate freshly prepared from 5.01 parts by weight of potassium hydrogen carbonate and 3:00 parts by volume of glacial acetic acid and the whole is boiled for 1 hour in a nitrogen atmosphere on the water bath. After cooling, the majority of the acetone is removed by evaporation under vacuum, water is added in the residue and then extraction is carried out with ether-methylene chloride (3:1). The extracts, washed with 0.1 N-sodium bicarbonate and water, are combined, dried with sodium sulfate and evaporated. 25 parts by volume of benzene are poured over the residue and the whole heated for 3 minutes to boiling. On evaporation under vacuum a crystalline residue is obtained. It constitutes the crude (18→11β)-lactone of the d,l-Δ⁵-3:3-ethylene - dioxy - 11β - hydroxy - 20 - oxo - 21 - acetoxy-pregnene-18-acid. The substance is completely free from halogen; it instantaneously reduces alkaline silver diamine solution. For purification the crude product is dissolved in benzene and chromatographed over 45 parts by weight of silica gel. Benzene and benzene-ethyl acetate mixtures (95:5 and 90:10) only elute impurities, wherein from benzene-ethyl acetate (75:25) mixtures the pure 3-ketal-21-acetate is isolated which after recrystallization from acetone melts at 231–233° C.

0.793 part by weight of the crude (18→11β)-lactone of d,l - Δ⁵ - 3:3 - ethylenedioxy - 11β - hydroxy - 20 - oxo - 21-acetoxypregnene-18-acid is covered with 40 parts by volume of 50% aqueous acetic acid and the whole heated for 45 minutes on a boiling water bath with passage of nitrogen. After cooling, the reaction mixture is evaporated under vacuum with the addition of 20 parts by volume of water to a small volume, then water added again and the whole extracted by shaking with an ether-methylene chloride mixture (3:1). The extract, washed with ice cold 0.5 N-sodium carbonate solution and water and dried with sodium sulfate, is evaporated and the almost completely crystalline residue subjected to distribution chromatography on cellulose. Formamide is used as stationary phase and cyclohexane-benzene mixture (1:1) as mobile phase. The first eluates consist of weakly polar impurities which are absorbent in ultra violet light. On further elution there follow first a comparatively small quantity of the (18→11β)-lactone of d,l-Δ⁴-3.20-dioxo-11β-hydroxypregnene-18-acid of M.P. 217–219° C. and then eluates of strong reduction capacity for alkaline silver diamine solution. These latter are combined and recrystallized from acetone-ether (about 1:3) with the application of methylene chloride as solution promoter. The infrared absorption spectrum of the resulting (18→11β)-lactone of d,l-Δ⁴-3:20-dioxo-11β-hydroxy-21-acetoxypregnene-18-acid of M.P. 244.5–247° C., when taken up in chloroform solution, agrees in every particular with that of the natural antipode obtained from aldosterone-21-monoacetate by oxidation with chromium trioxide as follows:

1.267 mg. of aldosterone monoacetate of M.P. 190–192° C. are dissolved in 0.12 cc. of glacial acetic acid and treated with 0.01 cc. of 2% chromium trioxide glacial acetitc acid solution. After 15 minutes the chromium trioxide is consumed and a further 0.01 cc. of the same solution is added. After 3½ hours a little methanol is added to the reaction solution and the whole allowed to stand for a further hour and then evaporated under vacuum at 30° C. The residue is taken up in chloroform-ether (1:3), washed at 0° C. twice with 0.15 cc. of N-sodium carbonate solution each time and twice with 0.1 cc. of water each time, the chloroform-ether solution dried and evaporated under vacuum. The neutral portion is recrystallized twice from acetone-ether and washed with ether and pentane. The melting point of the resulting 18:11-lactone of Δ⁴-3:20-dioxo-11β-hydroxy-21-acetoxy-pregnene-18-acid which occurs in colorless leaflets (also in part in clusters) is 187–190° C.

After further crystallization from a mixture of chloroform and ether this compound melts at 198–199° C. (flat needles) $[\alpha]_D^{26} = +117.2°$ (C=0.6186 in chloroform).

For hydrolysis of the acetate group, 6.3 mg. of the above compound are dissolved in 1 cc. of methanol, a solution of 7 mg. of potassium bicarbonate in 0.24 cc. of water are added and the whole is allowed to stand at 18° C. for 48 hours. After acidification with dilute hydrochloric acid it is extracted with a mixture of chloroform and ether (1:3), the extract washed first with water, then with sodium bicarbonate solution and again with water, dried, and the solvent evaporated under reduced pressure. The neutral portion so obtained amounts to 3.5 mg. and is the 18:11-lactone of Δ⁴-3:20-dioxo-11β-21-dihydroxy-pregnene-18-acid. After recrystallization from a mixture of acetone and ether it forms small grains which melt at 203–218° C.

The hydrolysis of the 3-ketal grouping as well as that of the 21-acetoxy group can be performed simultaneously in the following way:

0.358 part by weight of crude (18→11β)-lactone of d,l - Δ⁵ - 3:3 - ethylenedioxy - 11β - hydroxy - 20 - oxo-21-acetoxy-pregnene-18-acid is covered with 12.1 parts by volume of tetrahydrofurane. After the addition of 4.03 parts by volume of aqueous 4-n perchloric acid the mixture is shaken until the starting materials have dissolved completely. It is kept in the dark for 60 hours, then cooled in ice water, neutralized with 32.2 parts by volume of 0.5-n sodium bicarbonate solution, and the tetrahydrofurane is distilled off in vacuo. The aqueous suspension which remains behind is extracted by shaking with methylene chloride, the extract washed with 0.2-n sodium carbonate solution and water, dried with sodium sulfate, and evaporated. The crystalline residue is subjected to distribution chromatography on cellulose with formamide as the stationary phase and benzene as the mobile phase. The first eluates contain a weakly polar by-product which absorbs ultraviolet light. On further elutriation there is obtained an insignificant quantity of the afore-described (18→11β)-lactone of d,l-Δ⁴-3:20-dioxo-11β-hydroxy-pregnene-18-acid of melting point 217–219° C. and then, as the principal portion, fractions having a strong reducing effect on an alkaline silver diamine solution. From these latter fractions there is obtained by recrystallization from a mixture of acetone and ether the (18→11β)-lactone of d,l-Δ⁴-3:20-dioxo-11β:21-dihydroxypregnene-18-acid of melting point 230–235° C.

The starting material is prepared, for example, as follows:

A suspension of 2.015 parts by weight of the (18→11β)-lactone of d,l-Δ$^{5:16}$-3:3-ethylenedioxy-11β-hydroxy-20-oxo-pregnadiene-18-acid of M.P. 242–246° C., described in our copending application Ser. No. 769,996 filed October 28, 1958 in 530 parts by volume of 95% ethanol is hydrogenated at room temperature on 5.03 parts by weight of a 2% palladium-calcium carbonate catalyst with hydrogen at atmospheric pressure. After the quantity of gas calculated for one mol equivalent has been taken up and the starting material has passed completely into solution, the reaction comes to a standstill. The catalyst is filtered off, the filtrate evaporated under vacuum and the crystalline residue dissolved in 75 parts by volume of benzene and the solution filtered through a column of 2.62 parts by weight of active charcoal prepared with benzene. The colorless benzene solution is finally evaporated under vacuum and the residue recrystallized from ether with the application of methylene chloride as solution promoter. In this manner the (18→11β)-lactone of d,l-Δ$^5$-3:3-ethylenedioxy-11β-hydroxy-20-oxo-pregnen-18-acid is obtained in colorless plates which melt at 195–210.5° C. (with conversion into prisms). The splitting up of the ketal grouping in 3-position can be carried out, for example, as follows:

0.00846 part by weight of the (18→11β)-lactone of d,l-Δ$^5$-3:3-ethylenedioxy-11β-hydroxy-20-oxo - pregnene-18-acid is dissolved in 1 part by volume of 96% acetic acid and the solution treated with 1 part by volume of distilled water. After the production of an oxygen-free nitrogen atmosphere in the reaction vessel, the solution is heated for 30 minutes on a boiling water bath with continuous passage of a gentle stream of nitrogen. Then the acetic acid is distilled off under vacuum at 40° C. bath temperature. After a concentrate of about 0.25 part by volume has been obtained, 2.5 parts by volume of distilled water are added and the whole evaporated again to about 0.5 part by volume. Dilution with water is then carried out followed by extraction with methylene chloride and the extract is washed three times with 0.5 N-sodium bicarbonate solution and 6 times with water. The methylene chloride solution which has been dried with sodium sulfate, yields on evaporation under vacuum about 6.7 parts by weight of the (18→11β)-lactone of d,l-Δ$^4$-3:20-dioxo-11β-hydroxy - pregnene - 18 - acid, which after recrystallization from methylene chloride-ether melts at 218–220° C.

*Example 3*

0.02 part by weight of the d,l-Δ$^5$-3:3:20:20-bis-ethylenedioxy-11β-hydroxy-18-oxo-pregnene or 18:11-cyclosemiacetal is dissolved in 0.3 part by volume of dry pyridine, treated at 0° C. with 0.2 part by weight of acetic anhydride and the whole allowed to stand for 2 days at 25° C. It is then dissolved in pure ether, washed several times with 1.5 parts by volume of cold dilute hydrochloric acid, water, sodium bicarbonate solution and water, dried over sodium sulfate and evaporated under vacuum. The residue is chromatopgraphed on 1.2 parts by weight of alumina of activity 11. The first eluates with benzene-petrol ether (1:5) are rejected and the last together with those of benzene, contain the acetylated 18:11-cyclosemiacetal of d,l-Δ$^5$-3:3:20:20-bis-ethylenedioxy-11β-hydroxy-18-oxo-pregnene.

The ketal splitting and working up are carried out in an analogous manner to that described in Example 1. As reaction product there is isolated the acetylated 18:11-cyclosemiacetal of d,l-Δ$^4$-3:18:20-trioxo-11β-hydroxy-pregnene, which for monoketalization in 3-position is further treated as follows:

From a solution of 1 part by weight of the acetaylated 18:11-cyclosemiacetal of d,l-Δ$^5$-3:18:20-trioxo-11β-hydroxy-pregnene, in 74 parts by volume of absolute benzene free from thiophene and 37 parts by volume of methylethyl dioxolane, which has been distilled over lithium-aluminum hydride, 19 parts by volume of solvent are distilled off in a nitrogen atmosphere. Then the product is treated with a hot solution of 0.11 part by weight of p-toluene sulfonic acid in 85 parts by volume of benzene which solution has been dried by distilling off a few parts by volume of benzene and replacing the benzene distilled off by dry, fresh benzene. Within four hours a total of 203 parts by volume of solvent are now distilled off through a Vigreux column, in which operation, after distilling off 65 parts by volume of solvent, the volume of the reaction mixture is maintained constant by slow addition of 46 parts by volume of absolute benzene, then a mixture of 21.5 parts by volume of methylethyl dioxolane which has been distilled over lithium-aluminum hydride and 24.5 parts by volume of benzene and finally 46 parts by volume of benzene. The contents of the flask are then cooled and poured into 40 parts by volume of dilute sodium bicarbonate solution. After extracting twice with benzene, washing the organic solutions with 40 parts by volume of dilute sodium bicarbonate solution and water and drying, they are evaporated under vacuum. A solution of the residue in 10 parts by volume of benzene is chromatographed on 36 parts by weight of alumina (activity II). In the first benzene eluates is found the acetylated 18:11-cyclosemiacetal of d,l-Δ$^5$-3:3-ethylenedioxy-11β-hydroxy-18:20-dioxo-pregnene. The later benzene fractions contain unchanged starting material.

A mixture of 0.96 part by weight of the acetylated 18:11-cyclosemiacetal of d,l-Δ$^5$-3:3-ethylenedioxy-11β-hydroxy-18:20-dioxo-pregnene in 45 parts by volume of benzene and 20 parts by volume of a freshly prepared benzene solution which is 0.2 N as regards sodium methylate and 0.5-molar as regards oxalic acid dimethylester, is stirred for 18 hours with exclusion of moisture at room temperature. The product is then poured into 40 parts by volume of molar sodium dihydrogen phosphate solution and the whole extracted by shaking with a chloroform-benzene mixture (1:1). The extract, washed with water and dried with sodium sulfate, is evaporated under reduced pressure and the residue freed from oxalic acid dimethylester under high vacuum at 40° C. By recrystallization of the crude product from anhydrous ether with the application of methylene chloride as solution promoter there is obtained the acetylated 18:11-cyclosemiacetal of d,l-Δ$^5$-3:3-ethylene-dioxy-11β-hydroxy-18:20-dioxo-pregnen-21-oxalo-acid methylester.

To a suspension, cooled to 0° C., of 0.94 part by weight of the acetylated 18:11-cyclosemiacetal of d,l-Δ$^5$-3.3-ethylenedioxy-11β-hydroxy-18:20-dioxo-pregnen - 21-oxalo-acid methylester in 24 parts by volume of methanol, there are added with exclusion of moisture and with stirring, 4 parts by volume of a 0.5-N-methanolic sodium methylate solution and when a clear solution has been produced, this is treated within 1 minute first with 13.5 parts by volume of a methanolic 0.15-molar iodine solution and after a further 15 minutes gentle stirring, with a second portion of 4 parts by volume of 0.5 N-methanolic sodium methylate solution. The mixture is then stirred for a further 3½ hours at 0° C. and then the separation of the iodo ketone completed by addition of 5.0 parts by volume of 0.5-molar sodium dihydrogen phosphate solution and 40 parts by volume of 50% aqueous methanol. The fine crystalline colorless substance filtered off with suction from the mother liquor constitutes the acetylated 18:11-cyclosemiacetal of d,l-Δ$^5$-3:3-ethylenedioxy-11β-hydroxy-18:20-dioxo-21-iodo-pregnene; it is subjected to the following reaction with potassium acetate, preferably without further purification.

The resulting acetylated 18:11-cyclosemiacetal of d,l-Δ$^5$-3,3-ethylenedioxy - 11β - hydroxy-18:20-dioxo-21-iodo pregnene, after rinsing with 60 parts by volume of acetone, is added to potassium acetate freshly prepared from 5 parts by weight of potassium hydrogen carbonate and 3 parts by volume of glacial acetic acid and the whole boiled on the water bath for 1 hour in a nitrogen atmosphere. After cooling, the majority of the acetone is removed by evaporation under vacuum, water added to the residue and then the whole extracted with ether-methylene chloride (3:1). The extracts, washed with 0.1 N-sodium bicarbonate and water, are combined, dried with sodium sulfate and evaporated. The residue constitutes the acetylated 18:11-cyclosemiacetal of d,l-$\Delta^5$-3:3-ethylenedioxy-11$\beta$-hydroxy-18:20-dioxo-21-acetoxy-pregnene (d:l-aldosterone diacetate-3-ketal). The substance is completely halogen-free; it instantaneously reduces alkaline silver diamine solution.

0.8 part by weight of the acetylated 18:11-cyclosemiacetal of d,l-$\Delta^5$-3:3-ethylenedioxy-11$\beta$-hydroxy-18:20-dioxo-21-acetoxy-pregnene is covered with 40 parts by volume of 50% aqueous acetic acid and the whole heated for 45 minutes on a boiling water bath with passage of nitrogen. After cooling, the reaction mixture is evaporated under vacuum, with the addition of 20 parts by volume of water, to a small volume, then a further quantity of water added and the whole extracted by shaking with ether-methylene chloride mixture (3:1). The extract, washed with ice cold 0.5 N-sodium carbonate solution and water and dried with sodium sulfate, is evaporated and the residue chromatographed on 48 parts by weight of alumina of activity II. The first eluates with benzene-petrol ether (1:1) are rejected; the last and also those with benzene contain the acetylated 18:11-cyclosemiacetal of d,l-$\Delta^4$-3:18:20-trioxo-11$\beta$-hydroxy-21-acetoxy-pregnene (d,l-aldosterone diacetate).

From the above described diacetate, d,l-aldosterone can be prepared as follows:

To a solution of 0.0083 part by weight of d,l-aldosterone diacetate in 1.5 parts by volume of methanol is added 0.01 part by weight of potassium bicarbonate in 0.35 part by volume of water and after fusion, the whole is allowed to stand under vacuum for 48 hours at 20° C. Then methanol is removed under vacuum and the aqueous residue extracted by shaking twice with 50 parts by volume each time of chloroform-ether (1:3), the chloroform-ether solution being washed with water, dried over sodium sulfate and evaporated under vacuum. The resulting d,l-$\Delta^4$-3:18:20-trioxo-11$\beta$:21-dihydroxypregnene or the 18:11-cyclosemiacetal (d,l-aldosterone) after recrystallization from acetone-ether, melts at 180–182° C.

The starting material described in the above example is obtained as follows:

In a Claisen fractionating apparatus 0.1933 part by weight of (18→11$\beta$)-lactone of d,l-$\Delta^5$-3:3-ethylenedioxy-11$\beta$-hydroxy-20-oxo-pregnene-18-acid is covered with 25 parts by volume of a 0.002-molar solution of p-toluene sulfonic acid in purest ethylene glycol. At a bath temperature of 80–90° C. and a pressure of about 1 mm., within 5 hours about 12 parts by volume of ethylene glycol are distilled off. With reduction of the distillation pressure, the reaction mixture is finally concentrated to about 1 part by volume. After cooling, methylene chloride is added and the methylene chloride solution is washed three times with 0.02 N-sodium bicarbonate solution, eight times with water and dried over sodium sulfate. After evaporation of the solvent under vacuum at 40° C., 0.2182 part by weight is obtained of the crude (18→11$\beta$)-lactone of d,l-$\Delta^5$-3:3:20:20 - bis-ethylenedioxy - 11$\beta$-hydroxypregnene-18-acid, which after recrystallization from methylene chloride-ether melts at 248–250° C.

0.0873 part by weight of the (18→11$\beta$)-lactone of d,l-$\Delta^5$-3:3:20:20-bis-ethylenedioxy-11$\beta$-hydroxy-pregnene-18-acid described above is dissolved in 4.4 parts by volume of tetrahydrofurane which has been distilled over lithium aluminum hydride and there is added in the course of 15 minutes 0.45 part by volume of a 0.226 molar solution of lithium aluminum hydride in tetrahydrofurane. The reaction solution is stirred for another 3¾ hours at room temperature and then poured into a mixture of 2.1 parts by volume of a molar Rochelle salt solution, 0.81 part by volme of 0.5 N tartaric acid solution, and 4.4 parts by weight of ice. The tetra-hydrofurane is removed by careful concentration under vacuum. The precipitated crude product is taken up in methylene chloride, the extract is washed with a molar Rochelle salt solution and water, dried with sodium sulfate, and evaporated under reduced pressure. The resulting 18:11-cyclosemiacetal of d,l-$\Delta^5$-3:3:20:20 - bis-ethylenedioxy - 11$\beta$-hydroxy-18-oxo-pregnene is recrystallized from a mixture of methylene chloride and ether and then has a melting point of 160–164° C. Unlike the starting material, the compound exhibits no carbonyl band in the infra red absorption spectrum.

*Example 4*

A solution of 0.0895 part by weight of the d,l-$\Delta^5$-3:3:20:20 - bis - ethylene - dioxy - 11$\beta$ - hydroxy - 18-oxo-pregnene or its 18:11-cyclosemiacetal in 0.84 part by volume of pyridine and 0.49 part by volume of acetic anhydride is heated at 60–65° C. for 2 hours. The reaction mass is then concentrated by evaporation under reduced pressure at a bath temperature of 25–30° C., and the crude product freed from highly volatile constituents by taking it up repeatedly in ether. The residue which crystallizes from ether is the acetylated 18:11-cyclosemiacetal of d,l-$\Delta^5$-3:3:20:20-bis-ethylene-dioxy-11$\beta$-hydroxy-18-oxo-pregnene.

For ketal splitting, 0.0998 part by weight of the acetylated 18:11-cyclosemiacetal of d,l-$\Delta^5$-3:3:20:20-bis-ethylenedioxy-11$\beta$-hydroxy-18-oxo-pregnene are heated on the boiling water bath for 1¼ hours in a nitrogen atmosphere with 2.5 parts by volume of acetic acid of 67 percent strength. After cooling, the acetic acid is distilled off under vacuum, water being added, and the aqueous suspension is extracted by shaking with methylene chloride. The extract is washed with 0.5-N sodium bicarbonate solution and water, dried with sodium sulfate, evaporated under reduced pressure with the addition of ether, and the residue divided by distribution chromatography on cellulose. Formamide is used ts the stationary phase, and a 1:1 cyclohexane-benzene mixture as the mobile phase. The first eluates consist of a weakly polar accompany substance which absorbes ultraviolet light. On further elution another substance is obtained which also absorbs ultraviolet light but, unlike the former, reduces an alkaline silver diamine solution; it is the d,l-$\Delta^4$-3:18:20-trioxo-11$\beta$-hydroxy-pregnene or its 18:11-cyclosemiacetal and crystallizes from moist ether in the form of the hydrate of melting point 163.5–172.5° C.

The afore-described d,l-$\Delta^4$-3:18:20-trioxo-11$\beta$-hydroxy pregnene or its semiacetal, can be acetylated in the manner described in the first paragraph of Example 3, and converted according to the data given in the same example into the d,l-$\Delta^4$-3:18:20-trioxo-11$\beta$:21-dihydroxy-pregnene or its 18:11-cyclosemiacetal (d,l-aldosterone).

*Example 5*

A solution of 0.655 part by weight of the (18→11$\beta$)-lactone of d,l-$\Delta^5$-3:3-ethylenedioxy-11$\beta$-hydroxy-20-oxo-pregnene-18-acid-21-oxalo-acid methyl ester described in Example 2 in 105 parts by volume of a 1:3 mixture of methylene chloride and ether is shaken with 14 parts by volume of an n-potassium hydroxide solution. As soon as the enol-potassium salt, which separates in solid form, has dissolved completely, the layers are separated, the aqueous phase is extracted immediately with 12.5 parts by volume of a 1:3 mixture of ethylene chloride and ether and, after the addition of ice, acidified with 2-molar phosphoric acid. The precipitated crude acid is taken up in chloroform, the extract washed with water, dried and evaporated. On crystallization from methylene chloride there is obtained the pure (18→11$\beta$)-lactone of d,l-$\Delta^5$-3:3 - ethylenedioxy - 11$\beta$ - hydroxy - 20 - oxopregnene-18-acid-21-oxalo-acid of melting point 188–190° C. (decomposition).

Boiling acetone is added to a solution, prepared at 40° C. of 0.0459 part by weight of the (18→11β)-lactone of d,l - Δ⁵ - 3:3 - ethylenedioxy - 11β - hydroxy - 20 - oxo-pregnene-18-acid-21-oxalo-acid and 0.0335 part by weight of strychnine in 1.2 parts by volume of methylene chloride and the methylene chloride expelled by distillation. From the solution, concentrated to about 1 part by volume, the strychnine salt of the (18→11β)-lactone of the l-Δ⁵-3:3-ethylenedioxy - 11β - hydroxy - 20 - oxo - pregnene - 18-acid-21-oxalo-acid of melting point 203–204° C. (decomposition) and $[\alpha]_D = -47°$ (c=1.0 in methylene chloride) separates in nearly quantitive yield. The strychnine salt of the d-acid remains in the mother liquor.

A solution of 0.0268 part by weight of the strychnine salt of the (18→11β)-lactone of 1-Δ⁵-3:3-ethylenedioxy-11β-hydroxy-20-oxopregnene-18-acid-21-oxalo-acid in 10 parts by volume of methylene chloride is shaken at 0° C. in turn with 5 parts by volume of 1.5-n phosphoric acid, three portions of 2.5 parts by volume of 0.6-n phosphoric acid, and several times with ice water. Before the aqueous extracts are discarded, they are extracted one after the other into two further separating funnels containing 2.5 parts by volume of methylene chloride each. The methylene chloride solutions are then combined, dried with sodium sulfate, and evaporated. There is obtained in this manner the (18→11β)-lactone of l-Δ⁵-33:3-ethylenedioxy - 11β - hydroxy - 20 - oxopregnene - 18 - acid-21-oxalo-acid in the form of a colorless microcrystalline residue.

A mixture of 0.0174 part by weight of crude (18→11β)-lactone of 1-Δ⁵-3:3-ethylenedioxy-11β-hydroxy-20-oxo-pregnene-18-acid-21-oxoalo-acid, 0.170 part by weight of potassium bicarbonate, and 1.75 parts by weight of water is heated on the boiling water bath for 40 minutes during which time it is often agitated, then cooled, and the neutral reaction product taken up in a 1:3 mixture of methylene chloride and ether. The extract is washed with n-potassium bicarbonate solution and water, dried with sodium sulfate, and evaporated. On recrystallization from ether there is obtained the (18→11β)-lactone of 1-Δ⁵-3:3-ethylenedioxy-11β-hydroxy-20-oxopregnene-18-acid in the form of lustrous platelets.

A solution of 0.0200 part by weight of the (18→11β)-lactone of 1-Δ⁵-3:3-ethylenedioxy-11β-hydroxy-20-oxopregnene-18-acid in 0.70 part by volume of tetrahydrofurane is mixed with 0.35 part by volume of 3-n aqueous perchloric acid. After being maintained at room temperature for 4 hours it is mixed with 2.1 parts by volume of 0.5-n sodium bicarbonate solution, and the tetrahydrofurane is distilled off under reduced pressure while 1.05 parts by volume of water are added. The resulting suspension is extracted by agitation with a 1:3 mixture of methylene chloride and ether, the combined extracts are washed with 0.5-n sodium bicarbonate solution and water, dried with sodium sulfate and evaporated. From the residue there is obtained by recrystallization from acetone and ether the (18→11β)-lactone of 1-Δ⁴-3:20-dioxo-11β-hydroxy-pregnene-18-acid of melting point 194–198° C. and $[\alpha]_D = -176°$ (c=1.0 in chloroform).

In quite analogous manner to that described for the strychnine salt of the (18→11β)-lactone of 1-Δ⁵-3:3-ethylenedioxy-11β-hydroxy - 20 - oxopregnen - 18 - acid - 21-oxalic acid, the d-oxalo-acid is liberated from the diastereomeric salt remaining in the mother liquor after the precipitation with strichnine, the oxalo-acid residue is split off by treatment with potassium bicarbonate solution at an elevated temperature, and the resulting ketal converted into the (18→11β)-lactone of the d-Δ⁴-3:20-dioxo-11β-hydroxy-pregnene-18-acid of melting point 195–198° C. and $[\alpha]_D = +178°$ (c=0.95 in chloroform) by means of perchloric acid in aqueous tetrahydrofurane.

By heating with methylethyl-dioxolane in benzene by the process described in the third paragraph of Example 3, the (18→11β)-lactone of d-Δ⁴-3:20-dioxo - 11β - hydroxy-pregnene-18-acid can be converted into the (18→11β)-lactone of d-Δ⁵-3:3.- ethylenedioxy - 11β - hydroxy-20-oxopregnene-18-acid which has all the chemical properties of the racemic lactone used as starting material in Example 1. By reacting it as described in Example 2, there is obtained the (18→11β)-lactone of d-Δ⁴-3:20 - dioxo - 11β - hydroxy - 21 - acetoxypregnene-18-acid melting at 198–200° C. $[\alpha]_D = +118°$ (c=0.61 chloroform). This substance is identical with the natural antipode prepared from d-aldosterone-21-monoacetate by oxidation with chromium trioxide described in Example 2.

*Example 6*

1.18 parts of magnesium turnings are covered with 20 parts by volume of absolute ether and a mixture of 6 parts of ethyl bromide and 50 parts by volume of absolute ether is introduced dropwise while stirring at room temperature with the exclusion of moisture. When the reaction, which is initiated by gentle boiling, is finished, a solution of 3.74 parts of freshly prepared ethoxy-acetylene in 20 parts by volume of absolute ether is added in small portions, and the mixture is stirred until ethane is no longer evolved.

To the resulting reaction mixture is added, while stirring energetically, at 20–25° C. a solution of 8.6 parts of 4bβ - methyl - 2α - methallyl - 2β - carbethoxy - 4β - ethoxycarboxy - 7 - ethylene - dioxy - 1:2:3:4:4aα:4b: 5:6:7:8:10:10aβ-dodecahydrophenanthrene-1-one in 75 parts by volume of absolute benzene. The reaction mixture is stirred for a further 2½ hours at 20–25° C., and then poured on to 200 parts of a mixture of ice and water, and mixed with a saturated solution of ammonium chloride until there is a good separation into layers. After separating the benzene-ether solution, the aqueous layer is extracted with 300 parts by volume of ether, the organic solutions are washed with water, combined, dried and the solvent is evaporated in vacuo at a bath temperature of 50° C. The residue so obtained is crude 4bβ - methyl - 2α - methallyl - 1 - ethoxy - ethinyl - 2β-carbethoxy - 4 β - ethoxy - carboxy - 7 - ethylenedioxy-1:2:3:4:4aα:4b:5:6:7:8:10:10aβ - dodecahydrophenanthrene-1-ol.

15.3 parts of this compound are mixed with 100 parts by volume of dioxane and, after the addition of 6.5 parts by volume of aqueous sulfuric acid of 10 percent strength, the whole is stirred for 4 hours at 25° C. 15 parts by volume of a saturated solution of sodium hydrogen carbonate are then added, and the reaction mixture is concentrated in vacuo to about 40 parts by volume, the mixture is diluted with 200 parts by volume of ether, the ethereal solution is washed once with 80 parts by volume of water. After being dried with magnesium sulfate, the solution is evaporated and the last traces of dioxane are removed in vacuo. The resulting oily residue is chromatographed by the fractional elution method over aluminum oxide. There is obtained from the petroleum ether-ether and ether elutriates first a compound which as indicated by its infra-red spectrum no longer contains free hydroxyl groups and which has the structure of a 4bβ-methyl-2α-methallyl-1:1-carbethoxy-methylene - 2β - carbethoxy - 4β - ethoxycarboxy - 7-ethylene - dioxy - 1:2:3:4:4aα:4b:5:6:7:8:10:10aβ - dodecahydrophenanthrene, and then a compound containing hydroxyl, which is to be regarded as 4bβ-methyl-2α-methallyl-1-carbethoxy - methyl - 2β - carbethoxy - 4β-ethoxy - carboxy - 7 - ethylenedioxy - 1:2:3:4:4aα:4b: 5:6:7:8:10:10aβ - dodecahydrophenanthrene - 1 - ol.

By treating 1.3 parts of the hydroxyl-free compound with a solution of 3 parts of potassium carbonate in a mixture of 35 parts by volume of water and 35 parts by volume of methanol for 5 hours under reflux, and removing the methanol in vacuo, there is obtained the potassium salt of 4bβ-methyl - 2α - methallyl - 1:1 - carboxy-methylene - 2β - carbethoxy - 7 - ethylene - dioxy - 1:2: 3:4:4aα:4b:5:6:7:8:10:10aβ - dodecahydrophenanthrene-4β-ol in the form of an oily deposit. By the addition of water and gentle heating the salt is again dissolved, the solution is extracted with 150 parts by volume of ether, the aqueous solution is acidified slightly with a phosphate buffer (pH value about 6), and the free acid is extracted as quickly as possible with three portions each of 100 parts by volume of chloroform. After drying the combined chloroform extracts with sodium sulfate they are filtered and evaporated in vacuo at a bath temperature of 35° C. The residue consists of practically pure 4bβ-methyl - 2α - methallyl - 1:1 - carboxymethylene - 2β-carbethoxy - 7 - ethylene - dioxy - 1:2:3:4:4aα:4b:5:6: 7:8:10:10aβ-dodecahydrophenanthrene-4β-ol.

To a suspension of 1 part of this crude acid in 5 parts by volume of tetrahydrofurane are added, while cooling with Dry Ice, 100 parts by volume of liquid ammonia, and the reaction solution is intimately mixed. There are then added in small portions 6.5 parts of metallic potassium freshly cut under toluene, and, when the addition is complete, the whole is stirred for a further 2 hours at about −40° C. Then anhydrous iso-propyl alcohol is slowly introduced from a dropping funnel, while stirring, until the dark coloration of the dissolved metallic potassium has disappeared. The excess of ammonia is then allowed to evaporate at room temperature, 200 parts by volume of benzene are added and also cautiously 100 parts by volume of water, and the layers are thoroughly intermixed. The benzene solution is discarded. The aqueous alkaline solution is acidified to a pH value of 5–6 with a phosphate buffer, and is immediately extracted several times with chloroform. The chloroform extracts are washed with saturated sodium chloride solution, combined, dried, filtered and evaporated in vacuo. The residue so obtained is dissolved in dioxane and allowed to stand with an excess of diazo-ethane in ether overnight at room temperature. By evaporation in vacuo there is obtained crude 4bβ - methyl - 2β - methallyl - 1β - carbethoxymethyl - 2β - carbethoxy - 7 - ethylene- - dioxy-1:2:3:4:4aα:4b:5:6:7:8:10:10aβ - dodecahydrophenanthrene-4β-ol, which may be purified by chromatography over aluminum oxide.

7.36 parts of the 4bβ-methyl-1β-carbethoxymethyl-2α-methallyl - 2β - carbethoxy - 7 - ethylene - dioxy - 1:2:3: 4:4aα:4b:5:6:7:8:10:10aβ - dodecahydrophenanthrene-4β-ol described in this Example and 800 parts by volume of absolute tetrahydrofurane are added to 2 parts of lithium aluminum hydride and 50 parts by volume of tetrahydrofurane in a current of nitrogen while stirring. After stirring the mixture for 24 hours at room temperature, the excess of reducing agent is decomposed, while cooling, by the cautious addition of 10 parts by volume of water, and then the whole is stirred for a further 2 hours. The mixture is then filtered through Celite, and thoroughly washed with tetrahydrofurane. The filtrate is concentrated in vacuo in a current of nitrogen, and there is obtained therefrom 4bβ-methyl-1β-(2′-hydroxyethyl) - 2α - methallyl - 2β - hydroxy - methyl - 7 - ethylene-dioxy - 1:2:3:4:4aα:4b:5:6:7:8:10:10aβ - dodecahydrophenanthrene-4β-ol, which exhibits in the infra-red region the absorption at 2:75μ characteristic of hydroxyl groups.

To a solution of 5 parts of the resulting triol in 100 parts by volume of anhydrous pyridine there are slowly added, while stirring, in a current of nitrogen 2.6 parts of para-toluenesulfonic acid chloride, and then the whole is allowed to stand overnight at room temperature. The mixture is then poured on to a mixture of ice and saturated solution of sodium hydrogen carbonate, and extracted several times with ether. From the residue obtained by drying and evaporating the organic solution in vacuo, there is obtained 4bβ-methyl-1β-(2′-tosyloxy-ethyl)-2α-methallyl-2β-hydroxy-methyl-7-ethylene - dioxy - 1:2:3:4: 4aα:4b:5:6:7:8:10:10aβ-dodecahydrophenanthrene-4β-ol.

4 parts of the resulting tosylate are mixed with 50 parts by volume of benzene and 10 parts by volume of tetrahydrofurane and then with 2.3 parts of osmium tetroxide. The reaction solution is allowed to stand for 25 minutes at room temperature. There are then added in succession 50 parts by volume of alcohol and a solution of 5.1 parts of sodium sulfite in 30 parts by volume of water, and the whole is stirred for 30 minutes. The upper organic solution is separated and filtered, and then the lower layer is treated with alcohol and also filtered. After extensive concentration of the combined organic solutions in vacuo, water is added and the mixture is exhaustively extracted with chloroform.

To 3 parts of the residue obtained from the dried chloroform solutions by evaporation in vacuo, 40 parts by volume of methanol and 11 parts by volume of pyridine there are added, while stirring, 2.1 parts of periodic acid in 5 parts by volume of water, and the whole is stirred for 30 minutes. After the addition of water, the mixture is extracted several times with chloroform. From the residue obtained by drying the chloroform solutions and evaporating them in vacuo there is obtained 4bβ-methyl-1β-(2′-tosyloxyethyl)-2α-acetonyl-2β-hydroxy-methyl-7-ethylene-dioxy-1:2:3:4:4aα:4b:5:6:7:8:10:10aβ-dodecahydrophenanthrene-4β-ol.

5.62 parts of 4bβ - methyl-1β-(2′-toxyloxyethyl)-2α-acetonyl-2β-oxymethyl-7-ethylene - dioxy - 1:2:3:4:4aα:4b: 5:6:7:8:10:10aβ - dodecahydrophenanthrene-4β-ol in 40 parts by volume of methanol are mixed with 5.4 parts by volume of a 2 N-methanolic sodium methylate solution in a current of nitrogen while stirring. After 24 hours water is added, and the mixture is extracted by agitation with chloroform. 4 parts of the residue obtained by drying and evaporating in vacuo the chloroform solutions, 125 parts by volume of benzene, 50 parts by volume of methanol and 75 parts by volume of 2 N-methanolic sodium methylate solution are stirred for 2 hours at room temperature in a current of nitrogen. After diluting the mixture with water and agitating it with chloroform, the residue obtained by washing, drying and evaporating in vacuo the chloroform solution is chromatographed over aluminum oxide. In this manner there is obtained d:l-Δ⁵-3-ethylene-dioxy-11β:18-dihydroxy-20-oxo-pregnene.

*Example 7*

A mixture of 444.6 milligrams of the (18→11)-lactone of d:l-Δ⁵-3-ethylenedioxy-11β-hydroxy-20-oxo-21-acetoxy-17-isopregnene-18-acid, 90 cc. of methanol and 10 cc. of 0.5 N-solution of potassium hydrogen carbonate is boiled under reflux for one hour in an atmosphere of nitrogen. 40 cc. of water are then added to the reaction mixture, the methanol is distilled off in vacuo, and the aqueous residue is extracted with methylene chloride and a mixture of methylene chloride and ether (1:3). The extracts are washed with a 1 N-solution of sodium carbonate and with water, then combined, dried with sodium sulfate and evaporated. The residue which crystallizes almost completely from a mixture of methylene chloride and ether weighs in the dry state 384.2 milligrams and consists, as shown by paper chromatography of a test portion in the system formamide/cyclohexane-benzene-(1:4), substantially of two strongly reducing substances. For the purpose of preparative separation the crude material is dissolved in 13 cc. of methylene chloride and, after being applied to 130 sheets of Whatman paper No. 1 (18.5 x 45 centimeters) impregnated with formamide, is chromatographed in 3 hours. The two principal zones at Rf-values of 4.2 and 6.6, the position of which can easily be determined by the blue tetrazolium reaction, are cut out and, after being dried in a high vacuum for 16 hours, are separately eluted with aqueous tetrahydrofurane of 20% strength. The extract from each zone is first freed from tetrahydrofurane in vacuo and then the aqueous residue is extracted with methylene chloride. Each methylene chloride extract is washed with water in order to completely remove the formamide, and then dried with sodium sulfate and evaporated. From the upper zone there are obtained in this manner 47.2 milligrams of the crude crystalline 17β- ketol-lactone and from the lower zone 296.5 milligrams of the crude 17α-ketol-lactone.

The former lactone is dissolved in 8.5 cc. of tetrahydrofurane, and the solution is filtered through a layer of 95 milligrams of active carbon, which has been prepared in tetrahydrofurane, and the colorless filtrate is then evaporated in vacuo. The residue is recrystallized from acetone with the use of methylene chloride as solution promoter, and yields 26.8 milligrams of the (18→11)-lactone of d:l-Δ$^5$-3-ethylene dioxy-11β:21-dihydroxy-20-oxo-pregnene-18-acid in the form of lustrous lamellae melting at 209–215° C. with decomposition. In methylene chloride its infra-red absorption spectrum exhibits bands at 2.85μ (O—H); 5.64μ (γ-lactone-C=O); 5.83μ (ketone-C=O); and 9.07μ (ketal).

The crude (18→11)-lactone of d:l-Δ$^5$-3-ethylene-dioxy-11β:21 - dihydroxy-20-oxo-17-isopregnene-18-acid (296.5 milligrams) isolated from the lower zone is dissolved for purification in 18 cc. of tetrahydrofurane, the solution is filtered through a column of 600 milligrams of active carbon prepared in tetrahydrofurane, and the colorless filtrate is evaporated in vacuo. The residue is recrystallized from a mixture of acetone and ether. There are obtained 243 milligrams of small colorless lamellae of the starting material melting at 179–182° C. In methylene chloride the product exhibits an infra-red absorption spectrum having bands at 2.85μ (O—H); 5.64μ (γ-lactone-C=O); 5.81μ (ketone-C=O); and 9.09μ (ketal).

The 21-acetate used as starting material is obtained from the free 21-hydroxy-compound as follows:

20.15 milligrams of the pure (18→11)-lactone of d:l-Δ$^5$ - 3 - ethylene - dioxy - 11β:21 - dihydroxy - 20 - oxo-17-iso-pregnene-18-acid are dissolved with the exclusion of moisture in 0.41 cc. of anhydrous pyridine, 0.24 cc. of acetic anhydride is added to the solution, and the mixture is allowed to stand for 16 hours at 20–25° C. The reaction mixture is then evaporated under a high vacuum pump with the addition of toluene as entraining agent, the crystalline residue (22.65 milligrams) is dissolved in 5.0 cc. of benzene, the solution is filtered through a layer of 55 milligrams of active carbon prepared in benzene, and the colorless filtrate is evaporated. The crude product, on recrystallization from acetone, yields 16.60 milligrams of the pure acetoxy-ketone in the form of fine colorless prisms melting at 216–220° C.

In a manner completely analogous to that described above in this example the (18→11)-lactone of d:l-Δ$^4$-3:20-dioxo-11β,21-dihydroxy-17-iso-pregnene-18 acid and its 21-acetate are rearranged, by treatment with potassium hydrogen carbonate to yield the corresponding 17β-compounds. The above 17-iso-compounds are prepared as follows:

(a) 1.4 cc. of 3.8 N-perchloric acid are added, while cooling with ice, to a solution of 120 milligrams of the above 17-iso-acetoxy-ketone (melting at 216–220° C.) in 4.0 cc. of tetrahydrofurane. The resulting crystal suspension is then stirred at 20–25° C., during which all the starting material dissolves in the course of one hour. After a further 73 hours the aqueous solution is poured on to a 2.5-molar solution of sodium chloride and the mixture is extracted with chloroform. The extracts are washed with a 2.5 molar solution of sodium chloride, then united, and dried with sodium sulfate and evaporated in vacuo. Recrystallization of the residue from acetone yields 80 milligrams of the (18→11)-lactone of d:l-Δ$^4$-3:20 - dioxo - 11β:21 - dihydroxy - 17 - iso - pregnene - 18 acid in the form of colorless lamellae melting at 213–218° C. In methylene chloride the product exhibits in the infra-red absorption bands at 2.86μ (O—H); 5.65μ (γ-lactone-C=O); 5.82μ (isol. ketone-C=O); 5.98μ (conj. ketone-C=O); and 6.17μ (conj. C=C).

(b) 40.50 milligrams of the above described 17-iso-acetoxy-ketone melting at 216–220° C. are heated with 50 cc. of acetic acid of 50% strength on a boiling water bath, during which the starting material dissolves completely in a few minutes. After a reaction period of 30 minutes, the solution is cooled and evaporated under an oil pump with the addition of toluene. The crystalline residue obtained by taking up in ether yields from acetone 26.0 milligrams of pure (18→11)-lactone of d:l-Δ$^4$-3:20-dioxo-11β-hydroxy-21-acetoxy-17-iso-pregnene-18-acid in colorless prisms melting at 181–182° C. From the concentrated mother liquor a further 13.2 milligrams melting at 171.5–176.5 can be obtained by the addition of ether. The substance strongly retains its water of crystallization on being dried.

The (18→11)-lactone of d:l-Δ$^5$-ethylene-dioxy-11β-hydroxy-20-oxo-21-acetoxy-17-iso-pregnene-18-acid used as starting material is obtained as a by-product in the preparation of the corresponding 17β-compound in the following manner:

1.915 grams of the crude iodo-ketone which is obtained as a mother liquor constituent after separation of the pure (18→11)-lactone of d:l-Δ$^5$-3-ethylenedioxy-11β-hydroxy-20-oxo-21-iodo-pregnene-18 acid as described in Example 2 are reacted in the usual manner with a solution of potassium acetate freshly prepared from 6.25 grams of potassium hydrogen carbonate and 3.76 cc. of glacial acetic acid in 75.5 cc. of acetone and there are obtained by working up 1.360 grams of a brownish almost completely crystalline material. It is dissolved in 200 cc. of benzene together with 1.225 grams of the mother liquor residue from the recrystallization of the crude (18→11)-lactone of d:l - Δ$^5$ - 3 - ethylenedioxy - 11β - hydroxy - 20 - oxo - 21-acetoxy-pregnene-18 acid, and the solution is chromatographed over 130 grams of silica gel ("Davison THRU 200") by fractional elution method. As the eluting agents are used 800 cc.-portions of the following benzene-ethyl acetate mixtures:

Fractions:
  2 and 3_____ (95:5)
  4–7_____ (90:10)
  8–15_____ (85:15)
  16–19_____ (80:20)
  20–23_____ (75:25)
  24–27_____ (50:50)

The effectiveness of the separation may be followed on the basis of the melting points of the evaporation residues. The melting points increase, from fraction 6 (160–165° C.) to fraction 10 (214–220.5° C.), and then fall to fraction 14 (155–160° C.), and then again increase to fraction 16 (226.5–229° C.) and thereafter remain approximately constant from fraction 22 (225.5 to 230° C.).

Fraction 10, which weighs 85 milligrams, is recrystallized twice from acetone, the melting point remaining unchanged. The fine colorless prisms so obtained exhibit in admixture with the pure 17β-isomer a considerable melting point depression and they consist of the pure (18→11)-lactone of d:l-Δ$^5$-3-ethylene-dioxy-11β-hydroxy-20-oxo-21-acetoxy-17-iso-pregnene-18-acid. In methylene chloride the product exhibits in the infra-red absorption spectrum bands at 5.66μ (γ-lactone-C=O); a shoulder at 5.70μ (ester-C=O); 5.77μ (ketone-C=O); 8.16μ (ester C—O); and 9.10μ (ketal).

From fractions 16–22 there are obtained by recrystallization from acetone with the use of methylene chloride as solution promoter a total of 430 milligrams of the pure 17β-isomer melting at 229–232° C.

*Example 8*

A suspension of 36.05 milligrams of d:l-17-iso-aldosterone in 5.0 cc. of an 0.2-molar solution of potassium carbonate in methanol of 80% strength is agitated at room temperature until the starting material has completely dissolved. After a reaction period of 6 hours the reaction mixture is diluted with water, the methanol is distilled off under reduced pressure, and then the aqueous residue is extracted with methylene chloride. The organic extracts are washed with an ice-cold 0.5 N-solution of sodium carbonate and with water, then dried with sodium sulfate and evaporated. The crude product is taken up in 5.0 cc. of methylene chloride, then applied to 40 sheets of Whatman paper No. 1 (18.5 x 45 cm., washed with methanol and chloroform) impregnated with propylene glycol, and chromatographed for 20 hours in the system propylene glycol/toluene. After drying the paper in the air, the zone which corresponds to the position of a parallel run with cortisone is cut out and extracted with aqueous tetrahydrofurane of 20% strength. The extract is freed from tetrahydrofurane under reduced pressure, and the aqueous concentrate is then extracted by agitation several times with methylene chloride. The organic extracts are washed with water, dried with sodium sulfate and evaporated. By recrystallizing the residue from aqueous methanol there is obtained d:l-aldosterone in the form of colorless lamellae melting at 182–185°.

Instetd of the free d:l-17-iso-alderstone there may be used as starting material the ester of that compound prepared as follows; the free d:l-aldosterone being formed by simultaneous hydrolysis:

*18:21-diacetate.*—18.80 milligrams of d:l-17-iso-aldosterone are dissolved in 1.05 cc. of a separately prepared mixture of 14.90 cc. of anhydrous tetrahydrofurane, 3.24 cc. of pyridine and 190 cc. of acetic anhydride, and the mixture is allowed to stand with the exclusion of moisture for 16 hours at 20–25° C. The solution is then evaporated. in vacuo with the addition of toluene. After being taken up in ether and evaporated several times the amorphous residue weighs 23.40 milligrams. For the purpose of purification the crude product is dissolved in 1.25 cc. of methylene chloride, and is chromatographed on 12 sheets of Whatmann paper No. 1 (18.5 x 45 cm., washed with chloroform and methanol) impregnated with formamide for 2 hours in the system formamide/cyclohexane-benzene (1:1). From the strongly ultra violet absorbing zone having an Rf-value of 0.70 there are eluted with aqueous tetrahydrofurane of 20% strength 20.5 milligrams of d:l-18:21-di-O-acetyl-17-iso-aldosterone, which cannot be crystallized. In carbon disulfide it exhibits in the infra-red absorption spectrum the following bands: $5.69\mu$ (ester-C=O); a soulder at $5.75\mu$ (isol. ketone-C=O); $5.94\mu$ (conj. ketone-C=O); and $6.17\mu$ (conj. C=C); no band in the OH-region.

By using the corresponding quantity of propionic anhydride, trimethyl-acetic acid chloride, cyclopentyl-propionic acid chloride, phenyl-propionic acid chloride or succinic anhydride there is obtained in an entirely analogous manner the 18:21-di-propionate, -trimethyl-acetate, -cyclopentyl-propionate, -phenyl-propionate or -hemisuccinate of 17-iso-aldosterone.

*21-monoacetate.*—20.5 milligrams of the above diacetate and 1.25 cc. of acetic acid of 90% strength are heated in an oil bath having a temperature of 125° C. for 30 minutes in an atmosphere of nitrogen. After being cooled, the solution is evaporated with the addition of a total of 2.5 cc. of toluene under a high vacuum pump, and the residue (18.6 milligrams) is split up in a manner analogous to that described above for the crude diacetate by preparative paper chromatography in the system formamide/benzene. Elution of the strongly ultra-violet absorbing zone having an Rf-value of 3.3 is carried out with aqueous tetrahydrofurane of 20% strength, and, after extractive working up, there are obtained 10.65 milligrams of a crude product which crystallizes from ether. By recrystallization from a mixture of methylene chloride and ether the crude product yields 7.95 milligrams of pure d:l-21-O-acetyl-17-iso-aldosterone in the form of small colorless crystalline clusters melting at 158.5–162° C. In chloroform the product exhibits in the infra-red absorption spectrum bands at $2.78\mu$ (free O—H); $2.95\mu$ (assoc. O—H); $5.71\mu$ (ester-C=O); $5.77\mu$ (isol. ketone-C=O); $5.99\mu$ (conj. ketone-C=O); and $6.18\mu$ (conj. C=C).

The 17-iso-compound behaves in paper chromatography in a manner very similar to d:l-21-O-acetyl-aldosterone in that, for example, the displacements of the two substances in the system formamide/cyclohexane-benzene (1:2) practically do not differ from one another.

In a completely analogous manner d:l-21-O-propionyl-17-iso-aldosterone is obtained from d:l-18:21-di-O-propionyl-17-iso-aldosterone by the action of the corresponding amount of aqueous propionic acid of 50% strength.

The d:l-17-iso-aldosterone used as starting material is obtained as a by product in the hydrolysis of d:l-aldosterone-21-monoacetate in the following manner: A suspension of 201.3 milligrams of finely crystalline pure d:l-21-O-acetyl-aldosterone in 6.25 cc. of an 0.1 N-solution of potassium carbonate in aqueous methanol of 80% strength is vigorously agitated until dissolution of the starting material is complete. In the course of 8 minutes a completely clear solution is formed. After a further 2 minutes a piece of Dry Ice the size of a pea is added and the reaction mixture is concentrated in vacuo with the addition of a total of 1.75 cc. of methanol of 80% strength and 8.75 cc. of water, to a volume of 2.5 cc. The resulting crystalline suspension is filtered with suction, the crystallizate is washed with a small amount of water and dried over calcium chloride. The resulting 152.7 milligrams of coalesced lamellae melting at 161.5–163.5° C. consist, as determined by paper chromatography in the system propylene glycol/toluene (24 hours), of mixed crystals of d:l-aldosterone and d:l-17-iso-aldosterone. The mixture is split up by preparative paper chromatography (80 sheets). The reducing zone of the iso-compound recognisable by ultra-violet absorption immediately above the main reducing zone yields, after being eluted with aqueous tetrahydrofurane of 20% strength followed by concentration of the extract and extractive working up, 31.4 milligrams of crude product. For the purpose of purification the latter is treated with active carbon in solution in tetrahydrofurane and is finally recrystallized from acetone. There are obtained 13.14 milligrams of pure d:l-17-iso-aldosterone melting at 199–201.5° C. In chloroform this product exhibits in the infra-red absorption spectrum band at $2.77\mu$ (free OH); $2.87\mu$ (assoc. O—H); $5.83\mu$ (isol. ketone-C=O); $5.99\mu$ (conj. ketone-C=O); and $6.17\mu$ (conj. C=C).

What is claimed is:

1. A member selected from the group consisting of compounds of the pregnene series having the general formula

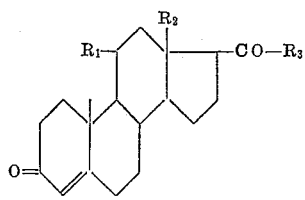

and 3-ketals of these compounds, in which $R_1$ is a member selected from the group consisting of a hydroxy group and an oxy group linked to the carbon atom 18, $R_2$ a member selected from the group consisting of a free hydroxymethyl group, a lower aliphatic carboxylic acid ester of an aldehyde group semi-acetalized with a hydroxyl group in 11-position, a monocyclic aromatic acid ester of an aldehyde group semi-acetalized with a hydroxyl group in 11-position, a carboxyl group lactonized with a hydroxyl group in 11-position, $R_3$ a member selected from the group consisting of the radicals

—$CH_2$—CO—COOH

—$CH_2$—CO—COO—lower alkyl

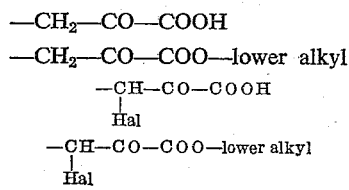

in which Hal stands for a member selected from the groups consisting of chloro, bromo and iodo, and alkali metal enolates thereof, and a chloromethyl, a bromomethyl and iodomethyl group.

2. The 18-acetate of the 18:11-cyclosemiacetal of the $\Delta^5$ - 3 - ethylenedioxy-11β-hydroxy-18:20-dioxo-pregnene-21-oxalo acid methyl ester of the formula

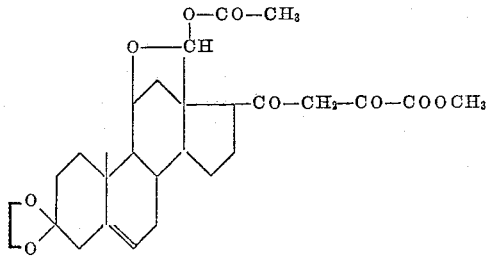

3. The (18→11)-lactone of the $\Delta^5$-3-ethylene-dioxy-11β - hydroxy - 20 - oxo-pregnene - 18 - acid-21-oxalo-acid methy ester of the formula

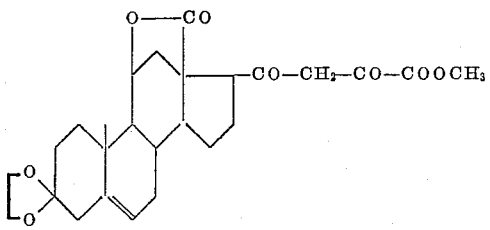

4. The (18→11)-lactone of the $\Delta^5$-3-ethylene-dioxy-11β - hydroxy - 20 - oxo-21-iodo-pregnene-18-acid of the formula

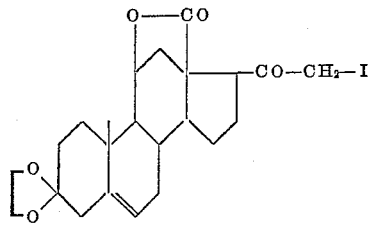

5. A member selected from the group consisting of compounds of the formula

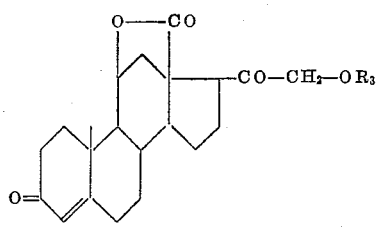

and corresponding 3-ketals in which $R_3$ is a member selected from the group consisting of a hydrogen atom, a carboxylic acid acyl radical derived from an aliphatic acid having from 1 to 20 carbon atoms, a monocyclic aromatic acid, a monocyclic lower araliphatic acid and a monocyclic lower alicyclicaliphatic acid.

6. A member selected from the group consisting of compounds of the formula

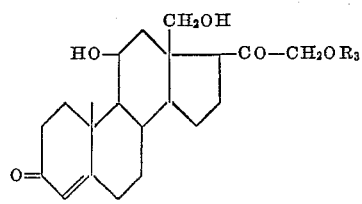

and the corresponding $\Delta^5$-3-ethylenedioxy derivatives in which $R_3$ is a member selected from the group consisting of a carboxylic acid acyl radical derived from an aliphatic acid having from 1 to 20 carbon atoms, a monocyclic aromatic acid, a monocyclic lower araliphatic acid and a monocyclic lower alicyclicaliphatic acid.

7. The $\Delta^4$ - 3:20 - dioxo-11β:18-dihydroxy-21-acetoxy-pregnene of the formula

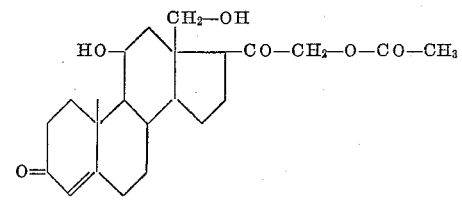

8. The (18→11)-lactone of the $\Delta^4$-3:20-dioxo-11β:21-dihydroxy-pregnene-18-acid of the formula

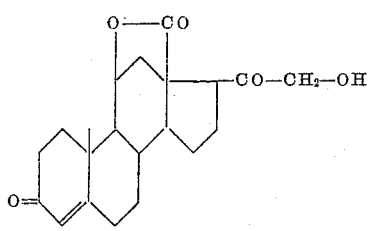

9. The 21-acetate of the compound of claim 8.
10. The 3-ethylenedioxy derivative of the compound of claim 8.
11. The 3-ethylenedioxy derivative of the compound of claim 9.
12. Process for the isomerization of 18-oxygenated steroids, wherein a member selected from the group consisting of a 17-iso-compound of the formula

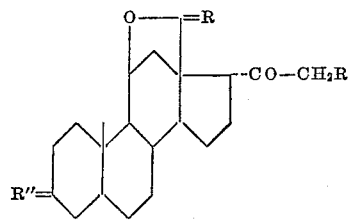

in which R represents a member selected from the group consisting of an oxo group, a hydrogen atom together with a free hydroxy group and a hydrogen atom together with a hydroxy group esterified with an organic carboxylic acid, R' stands for a member selected from the group consisting of a free hydroxyl group and a hydroxyl group esterified with an organic carboxylic acid and R" for a member selected from the group consisting of a free and a ketalized oxo group, and a corresponding compound containing a double bond extending from the 5-carbon atom, is treated with an alkaline agent, and the resulting compound having a 17β-side chain separated.

13. A member selected from the group consisting of a $\Delta^4$- and a $\Delta^5$-17-iso-pregnene compound of the formula

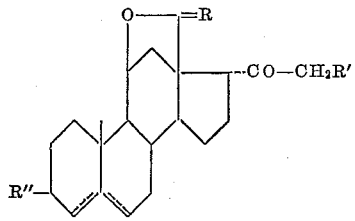

in which R represents a member selected from the group consisting of an oxo group, a hydrogen atom together with a free hydroxy group, a hydroxyl group esterified with a lower aliphatic acid, a hydroxyl group esterified with a monocyclic aromatic acid, R' stands for a member selected from the group consisting of a free hydroxyl group, a hydroxyl group esterified with an aliphatic acid having from 1 to 20 carbon atoms, a monocyclic aromatic acid, a monocyclic lower araliphatic acid and a monocyclic lower alicyclicaliphatic acid and R" for a member selected from the group consisting of a free and a ketalized oxo group.

14. The (18→11)-lactone of $\Delta^4$-3:20-dioxo-11$\beta$:21-dihydroxy-17-iso-pregnene-18-acid.

15. The $\Delta^5$-3-ethylene ketal of the compound of claim 14.

16. The (18→11)-lactone of $\Delta^4$ - 3:20 - dioxo-11$\beta$-hydroxy-21-acetoxy-17-iso-pregnene-18-acid.

17. The $\Delta^5$-3-ethylene ketal of the compound of claim 16.

18. 17-iso-aldosterone.

19. 21-O-acetyl-17-iso-aldosterone.

20. The $\Delta^4$-3:20-dioxo-11$\beta$:18:21-trihydroxy-pregnene of the formula:

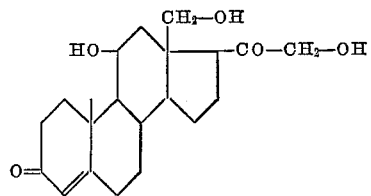

References Cited in the file of this patent
UNITED STATES PATENTS

| | | |
|---|---|---|
| 2,852,529 | Poos | Sept. 16, 1958 |
| 2,862,851 | Reichstein et al. | Dec. 2, 1958 |
| 2,862,925 | Reichstein et al. | Dec. 2, 1958 |
| 2,868,784 | Ruzicka et al. | Jan. 13, 1959 |
| 2,904,545 | Reichstein et al. | Sept. 15, 1959 |
| 2,973,357 | Johnson et al. | Feb. 28, 1961 |

UNITED STATES PATENT OFFICE
CERTIFICATE OF CORRECTION

Patent No. 3,035,049

May 15, 1962

Tadeus Reichstein et al.

It is hereby certified that error appears in the above numbered patent requiring correction and that the said Letters Patent should read as corrected below.

Column 2, line 32, for "formulae" read -- formula --; lines 38 and 50, for "Formulae", each occurrence, read -- Formula --; column 3, line 33, after "methods" insert -- known --; column 4, the second formula should appear as shown below instead of as in the patent:

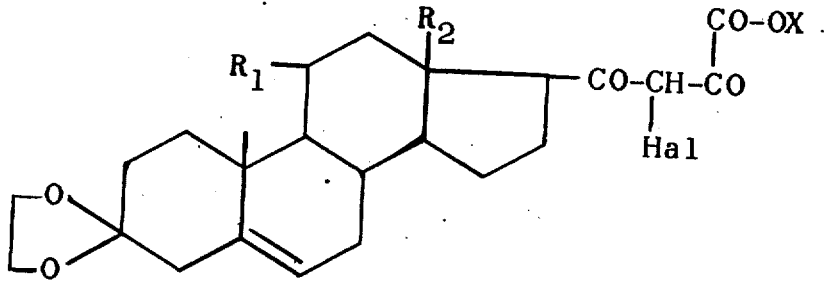

column 11, line 61, for "ll" read -- II--; column 12, line 51, for "3.3-" read -- 3:3- --; column 16, line 39, for "-ethylenedioxy-" read -- -ethylene-dioxy- --; line 60, for "-ethoxycarboxy-" read -- -ethoxy-carboxy- --; same column 16, line 65, for "-ethylenedioxy-" read ---ethylene-dioxy- --; column 17, line 36, for "-2β-" read -- -2α- --; line 59, for "2:75μ" read -- 2.75μ --; column 21, line 25, for "190 cc." read -- 1.90 cc. --; column 23, line 2, for "groups" read -- group --; line 21, for "methy" read -- methyl --; column 24, lines 38 to 47, the formula should appear as shown below instead of as in the patent:

3,035,049

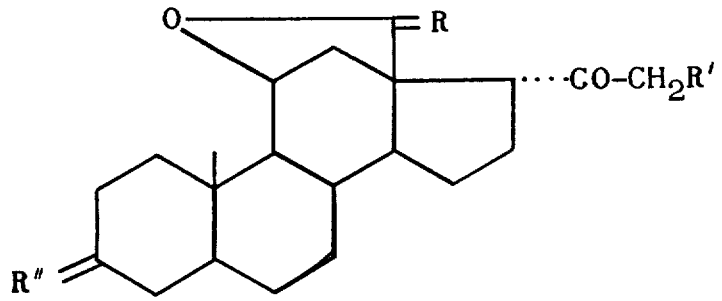

Signed and sealed this 12th day of May 1964.

(SEAL)
Attest:

ERNEST W. SWIDER
Attesting Officer

EDWARD J. BRENNER
Commissioner of Patents